Patented Dec. 7, 1926.

1,609,598

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

PROCESS OF ASSEMBLING INSULATOR PARTS.

No Drawing.   Application filed March 1, 1923. Serial No. 621,970.

This invention relates to the manufacture of insulators or other articles in which it is desirable to connect the parts in such a way as to provide more or less elasticity in the connecting joints.

One of the objects of the invention is to provide a method of assembling the parts so that the bearing between the connecting surfaces will be relieved at certain portions without decreasing the efficiency of the connecting material.

Another object is to provide economical and convenient manufacturing methods which shall be efficient in operation and produce articles of improved construction and operation.

The invention is exemplified in the steps of the process described in the following specification.

In the manufacture of insulators such as shown in my prior Patent No. 1,284,975 one member is provided with a roughened surface covered with a coating of wax or other yielding material and connected to another member by cement applied to the coated surface. In order to facilitate the assembly of insulators embodying the features of this patent, it is highly desirable that the volatilization of constituents in the coating compound be controlled to control the entry of the coating compound into the cement. By controlling the volatilization or penetration of the compound, it is possible to control the strength of the cement, even under wide conditions of setting temperature.

In the ordinary assembly it is advisable to use a volatile constituent in the coating compound which is usually sprayed over the roughened or sanded surface. This volatile constituent facilitates the coating or application of the compound in a coat of proper thickness. In addition, the escape of this volatile material leaves a small space so that the dielectric will not be subjected to a hydrostatic pressure after the curing process, particularly where the coating compound is such that it will not penetrate the cement except under heavy pressure. If naphtha or gasoline is used, or a thin oil, as a constitutent of the coating, these will readily penetrate the cement so that there will be no direct pressure between the coating compound and the cement.

It is evident, however, that on warm days or with higher temperatures that these materials will penetrate the cement readily as soon as the water content is reduced in same. This penetration may be used in some cases to arrest the hardening or setting of the cement so that it will not have too high strength compared to the porcelain permitting undue stress to be set up. In other cases, however, where it is desired to develop a very high strength in the cement the penetration of the coating compounds into the cement will tend to prevent further hardening or setting and thereby prevent its reaching a high strength.

Where the surfaces carrying a heavy load are small it is usually desirable to develop a high strength in the cement. This is particularly true of the cement surrounding the pin of a suspension insulator which has a relatively small bearing. In cementing on the cap of the insulator however, it is not necessary to develop this high mechanical strength, as the cement area is several times that around the pin hole. Pin type insulators also have relatively large cement areas compared to the mechanical duty which they have to perform, consequently it may be an advantage to arrest the setting of the cement, at the same time not affecting the mechanical ultimate of the insulator.

After assembling at higher temperatures, it frequently happens that metal parts such as flanges on bushings, or caps on insulators, will tend to set up a high shearing stress at low temperatures when the metal is contracted. This stress may be relieved by the use of more expensive metal parts or by the control in the coating on the roughened surface. It is evident that where the coats are heavy, considerable more relief may be obtained. The heavier the coating, however, the more difficult it is to regulate the stress of the cement, as the amount of compound present is sufficient to greatly affect the strength of the cement under certain conditions. This is particularly true where the cement dries out rapidly before sufficiently hard. The amount of compound being sufficient to practically impregnate the cement, so it is not possible to harden the cement later even though water is applied.

It is also evident that where volatile constituents are used in the compound if they give off gas, same will drive the cement away from the particles of sand or roughened surface tending to affect the strength of the joint. This driving away of the cement may be a decided detriment where looseness is an objection at a later time, such as in the case of insulators used for disconnecting switches or bus work, or where a certain degree of tightness is desired in the joint. In order to prevent this driving away of the cement or the penetration of the compound into the cement before desired, the insulators after being assembled are placed in a pressure chamber, the pressure of which is raised so that there will be less, or no volatilization of the compounds used at the pressure.

By proper control of pressure, it is not necessary to increase the saturation of the air. This increased pressure will tend to prevent evaporation from the cement so that a higher temperature may be used in order to hasten the initial setting. The pressure and temperature may be controlled until the cement has reached the proper degree of hardness; the insulators may then be removed and used in the ordinary way. If, however, it is desired to arrest the hardening of the cement at any point same may be readily accomplished by removing the pressure and increasing the temperature, or by a proper control of the two such that evaporation will take place. Evaporation may be materially hastened by applying a vacuum, particularly where the insulators are well heated. The application of temperature and lowered pressure will hasten the volatilization of the volatile constituency of the coating compound. The drying out of the cement will also permit the entry of portions of the coating compound or wax so that space will be provided which will prevent the setting up of hydrostatic pressure thru the expansion of the compound, or wax under heat, at a later time. This is particularly important as asphalt or hydrocarbons used for coating have a high expansion rate and may set up considerable pressure if they are tightly sealed by a dense cement.

In assembling the various parts it is usually necessary to keep same in alignment. It has been customary to use wedges, sand or wax which will hold same in position.

In the above method where sand is used, same is usually wet so that it will supply water to the cement rather than dry out same. Where wax is used such as paraffine, this tends to seal the joint and prevent escape of the water. Under the above conditions, the wax may be used but same may be used to impregnate the joint by raising the temperature at the close of the setting and after drying the cement. The above treatment applies particularly to joints where there is an excess in mechanical strength. In joints where the mechanical strength must be developed to a high degree or where it is desired to maintain the conductivity of the cement in order to insure electro-static distribution of stress as in the multipart insulator, it is usually desirable to prevent the entry of compound, or where tightness in the joint is desired it is usually advisable to obtain initial set of cement in air. This may be hastened by the application of pressure and temperature without producing any undesirable effect on the cement.

As soon as the cement has set sufficiently so that water will not harm the cement the chamber in which the insulators are setting may be filled with water. This will insure that all of the cement joints are covered with water which will prevent drying out of same. A higher temperature may then be applied with certainty, particularly where the pressure is increased to prevent volatilization of any of the constituents of the compound. The increase in pressure will also tend to prevent the expansion of air which may be included in the cement or joints. This expansion of the air if permitted under rising temperature will tend to drive out the water and affect the hardening of the cement. If however the pressure is increased the air will be compressed and there will be a tendency to drive water into the cement rather than out of same. The increasing pressure may be obtained by simply lowering the insulators into a deep open tank, or in any other convenient manner. The amount of pressure and temperature will depend upon the result desired.

By curing the insulators in a bath of water or under conditions which will permit complete hydration of the cement at higher temperatures, it is possible to affect a joint of a high degree of reliability, and it is also possible to effect the curing in a very much shorter time.

Without covering the insulators with water or the use of increased pressures, it is difficult to form a reliable joint and maintain resiliency in same. This is of increasing importance with the ever increasing loads imposed by the large transmission lines, for it is practically necessary that a resilient joint be provided in order that the load may be distributed over a considerable portion of the surface. Provision must also be made so that undue stress will not be set up at low temperatures, owing to the contraction of metal parts which can be most easily obtained thru the use of a resilient joint by controlling the setting of the cement so that grading of the joint may be obtained with certainty.

Following the hardening of the the cement under water the insulators may be removed from same or the water drained from the curing chamber. The insulators then may be cleaned and dried by the application of heating or by applying heat and a vacuum as in the first method outlined. When the cement has become dry the volatile constituencies may escape from the compound and a portion of the compound or wax penetrate the cement without destroying the mechanical strength of same. It is well known that the penetration of the compound or wax into the cement will tend to prevent cement expansion by the prevention of the absorption of water.

With the resilient joint and the wax applied for coating, it is not necessary to impregnate the joints completely to prevent expansion of the cement by weathering or absorption of water after placed in operation. If desired, however, the pressure and temperature may be used to drive in wax or other impregnating compound. The customary practice of coating the surface of the dried cement with a coating of paraffine and naphtha, or paraffine and gasoline, may be applied after the insulators are removed from the curing chamber.

It is evident that where a wax is used to hold the parts in position that same may be placed immediately in water where the wax will cover the cement and prevent washing away of same. The process is of particular value, as the short time required for the initial set, particularly where air pressure and temperature are used permits the use of jigs for the aligning of parts. The short time required for the initial set of the cement where the high temperature and pressure are used will require only a few jigs, so that the cost for same will be comparatively small. Where a long time is required, however, in the initial setting the investment for jigs would be so large that the process would not be feasible. With the short time required the jigs may be placed on a conveyor system and the whole process placed on a continuous basis. For the jig assembly, it is usually advisable to remove the insulators for final curing in order to keep down the investment for jigs, even where the curing time is comparatively short.

One of the considerable advantages of the method as outlined is labor saved in cleaning the insulators. Where insulators are assembled in steam rooms, in addition to lack of uniformity of temperature control and humidity, the insulators become water marked. In addition, a thin film of cement left on the surface from the assembly may attach itself firmly to the surface owing to the thin film of water condensed in the steam room.

Where pressure is depended upon to prevent evaporation from the main body of the cement the thin film of cement over the surface can be prevented from adhering itself firmly to the surface. Even where the insulators are later cured in water this film may be removed very readily by wiping or by a blast of air containing particles such as saw dust which will clear the surface. Where the insulators are cured in clean water they will come out of same in a clean condition and require very little work for polishing, which may be accomplished by hand or by a mechanical washer or polisher.

In general, the curing with increased temperature and pressure is applicable to insulators which have large cement areas requiring the highest degree of strength in the cement.

Where great uniformity is required and a very high strength in the cement, curing in water has advantages over any other process as conditions may be maintained very uniform. It is very difficult to provide sufficient water to cure cement in a steam room, as once the insulators are heated there may be no further condensation; hence, if water does not drain or drip on to a cement joint, some insulators in a steam room are likely to have insufficient moisture.

Curing under water insures hydration of the cement, as the capillary attraction particularly where same is aided with the increased pressure will keep the cement saturated. This saturation permits a very complete hydration and also prevents the compound from entering the cement as explained above. The great advantages in the method are increased uniformity, decreased cost required for cleaning, and shorter time required for curing, as well as temperature control.

I claim:

1. The process of joining parts of insulators or similar articles, wherein a surface of one of the parts is roughened and coated with a fusible or volatile substance, said process comprising the steps of connecting said surface by means of cement to another part and submerging the joint thus formed in water to prevent entry of the coating material into the cement during setting of the cement.

2. The process of joining insulator or similar parts, one of which has projections on a surface thereof partially covered with a coating of fusible or volatile material, said process including the application of cement to said surface, curing of the cement and at the same time preventing material of said coating from entering the cement, drying the cement after curing and permitting entry of the coating material in liquid or gaseous form into said cement to relieve the parts at the bases of said projections.

3. The process of assembling insulator parts, wherein, a coating material and cement is used between the connected parts, said process including the steps of curing the cement under water to prevent entry of the coating material into the pores of the cement during the curing operation and subsequently drying the cement to permit entry of the coating material into the cement after the cement has set.

4. The process of assembling insulator parts, wherein, the connecting surface of one part is roughened to provide projections and coated with a fusible or volatile material to partially cover the projections and prevent contact of the connecting cement with the bases of said projections, said process including a partial curing of the connecting cement in air, and further curing thereof under water to prevent entry of the coating material into the cement after the curing has reached a stage at which such entry is liable to occur.

5. The process of assembling insulator parts, wherein, the connecting surface of one part is roughened to provide projections and coated with a fusible or volatile material to partially cover the projections and prevent contact of the connecting cement with the bases of said projections, said process including a partial curing of the connecting cement in air, and further curing thereof under water to prevent entry of the coating material into the cement after the curing has reached a stage at which such entry is liable to occur, and drying the cement after curing to cause the coating material to enter the pores thereof in liquid or gaseous form and thus relieve the joint at the bases of the projections.

6. The process of assembling insulator parts, wherein, a roughened surface is coated with a material which is readily melted or volatilized, said method including the steps of connecting said surface with another part by means of cement, curing said cement under pressure and relieving the pressure after the cement has set to permit the coating material to be absorbed by the cement.

7. The process of assembling insulator parts, wherein, a connecting surface is roughened and coated with volatile or fusible material and joined by cement to the connected part, the joint being heated to facilitate curing and subjected to pressure to prevent melting or volatilization of the coating material under the influence of the heat applied during the heating of the cement.

8. The process of assembling insulator parts, wherein, a connecting surface is roughened and coated with volatile or fusible material and joined by cement to the connected part, the joint being heated to facilitate curing and subjected to pressure to prevent melting or volatilization of the coating material under the influence of the heat applied during the heating of the cement, the pressure being reduced after setting of the cement to permit the coating material to enter the cement in liquid or gaseous form and thus relieve the portion of the joint at the bases of the projections.

9. The process of connecting insulator or like parts, wherein, a connecting surface is provided with projections and a coating of a material which may be easily melted or volatilized is applied thereto, said surface being joined to another by cement which is permitted to partially cure in air, the curing process being finished under water which is heated to facilitate setting of the cement and which has sufficient head to produce a pressure which will prevent entry of the coating material into the cement during the curing operation.

10. The process of connecting insulator or like parts, wherein, a connecting surface is provided with projections and the coating of a material which may be easily melted or volatilized is applied thereto, said surface being joined to another by cement which is permitted to partially cure in air, the curing process being finished under water which is heated to facilitate setting of the cement and which has sufficient head to produce a pressure which will prevent entry of the coating material into the cement during the curing operation, the cement being dried, after it has set, at a sufficiently high temperature to cause the coating material to enter the cement and relieve the joint.

11. The method of assembling insulator parts, wherein, a roughened surface is coated with a material which melts or volatilizes when heated, said surface being joined to another by cement when the parts of the insulators are assembled, the joint being permitted to partially cure in air which is heated to facilitate setting of the cement, sufficient pressure being applied to prevent the coating material from entering the cement, after which the curing operation is completed under water which is also heated to facilitate curing and which has sufficient head to prevent entry of the coating material into the cement at the temperature employed, the joint being dried after the setting of the cement is completed and sufficiently heated to cause the coating material to enter the cement in gaseous or liquid form and thus relieve the joint at the bases of the projections on the roughened surface.

12. The process of assembling insulator parts, comprising the steps of applying a coating of fusible or volatile material to a roughened surface of one part, connecting said surface by means of cement to another part and regulating the entry of said coating material into the cement by controlling the temperature and pressure of the surrounding medium while the cement sets and thus, determining the degree of hardness of the cement in the finished joint.

13. The method of assembling insulator parts, comprising the steps of coating a roughened surface on one of the parts with a material which may be melted or volatilized, connecting said surface by means of cement to another part and heating the joint to facilitate hardening of the cement, the pressure of the surrounding medium being raised above atmospheric during said setting thus controlling volatilization of the coating material and permitting the cement to set without interference from said material.

14. The method of assembling insulator parts, wherein, a roughened coated surface is connected by cement to an adjacent part and the cement permitted to harden in a closed chamber in which the pressure and temperature are regulated thus facilitating hardening of the cement and preventing interference therewith by volatilization of the coating material during the hardening process.

15. The method of assembling insulators, comprising the steps of coating a roughened surface of one part with a fusible or volatile substance, connecting the coated surface by means of cement to another part, permitting the cement to set in a closed chamber which is heated to facilitate setting of the cement and in which the pressure is raised above atmospheric to prevent volatilization of the coating material during setting of the cement and reducing the pressure after the cement has sufficiently hardened to permit the coating material to enter the cement and relieve pressure in the joint.

16. The method of assembling insulator parts, wherein, a roughened coated surface is connected by cement to a co-operating part, the cement being heated in a closed chamber to facilitate setting, the pressure in said chamber after partial setting of the cement being reduced below atmospheric to cause the coating material to enter the cement at a pre-determined stage, to control further setting of the cement.

17. The process of assembling insulators, wherein, a roughened coated surface is connected by cement to a co-operating part, the joint being sealed thus preventing escape of water and heated thus facilitating setting of the cement.

18. The method of assembling insulators, wherein, a roughened coated surface is joined by cement to a co-operating part, the joint being sealed during a portion of the period in which the cement sets thus preventing escape of water and controlling entry of the coating material into the cement, the cement being heated thus facilitating setting.

19. The method of assembling insulators, where, a roughened coated surface is joined by cement to a co-operating part, the joint being heated thus facilitating setting of the cement and sealed thus preventing drying and entry of the coating material into the cement during the setting operation, the seal being removed after the cement has sufficiently hardened so that entry of the coating material into the cement will not be injurious after which the joint is heated at a reduced pressure thus melting or volatilizing the coating material to relieve the parts from pressure.

20. The method of assembling insulators, wherein, a roughened coated surface is joined by cement to a co-operating part, the joint being immersed in water and sealed thereby to prevent volatilization of the coating material and heated while thus sealed to facilitate setting of the cement after which the water is removed and the joint dried at a reduced pressure to cause the coating material to become volatilized or melted, thus preventing excessive pressure at points where the coating material was placed.

21. The method of joining insulator parts wherein the parts are united by cement in the presence of a volatile material and the entry of the volatile material into the cement is regulated by regulation of temperature and pressure thus determining the character of the joint produced.

22. The process of connecting insulator parts wherein cement is interposed between said parts, the joint thus formed being subjected to pressure of the surrounding fluid medium greater than atmospheric pressure and the cement permitted to set while subject to such pressure.

23. The method of cementing the surface of an article comprising the steps of roughening the surface to provide projections to interlock with the connecting cement, applying cement to the roughened surface, subjecting the cement to pressure in excess of atmospheric pressure of the surrounding fluid medium and permitting the cement to set while subjected to such pressure.

24. The method of connecting articles by cement comprising the steps of roughening one of the surfaces to be connected to provide projections thereon for interlocking with the connecting cement, interposing cement between the surfaces of said articles, subjecting the cement to pressure of the surrounding fluid medium in excess of atmospheric pressure and permitting the cement to set while subjected to such pressure.

25. The method of assembling insulator parts wherein the connecting surface of one of the parts is roughened to provide projections to interlock with the connecting cement, interposing cement between the surfaces of said parts, subjecting the cement to pressure of the surrounding fluid medium in excess of atmospheric pressure and permitting the cement to set while subjected to such pressure.

26. The process of cementing together the parts of an insulator in which one or both of the spaced connecting surfaces comprises spaced projections to interlock with the connecting cement comprising the steps of applying a coating of fusible or volatile material to one or both of the connecting surfaces, connecting said surfaces by means of hydraulic cement, permitting the cement to dry, and then heating the parts to fuse or volatilize the said coating to permit entry of the coating material into the cement.

27. The process of cementing together the parts of an insulator in which one of the parts is provided with a connecting surface having spaced projections to interlock with cement interposed between the parts, said process comprising the steps of applying a coating of fusible or volatile material to one of the connecting surfaces, connecting said surfaces by means of hydraulic cement, submerging the connected parts in a bath of hot water, and permitting the parts to remain in said bath only until the cement is set.

In testimony whereof I have signed my name to this specification on this 24th day of February A. D. 1923.

ARTHUR O. AUSTIN.